United States Patent
Mashimo et al.

(10) Patent No.: US 12,283,684 B2
(45) Date of Patent: Apr. 22, 2025

(54) SECONDARY BATTERY ELECTRODE AND METHOD FOR PRODUCING THE ELECTRODE

(71) Applicant: Prime Planet Energy & Solutions, Inc., Tokyo (JP)

(72) Inventors: Naohiro Mashimo, Toyota (JP); Katsushi Enokihara, Toyota (JP); Haruka Shionoya, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 573 days.

(21) Appl. No.: 17/680,310

(22) Filed: Feb. 25, 2022

(65) Prior Publication Data
US 2022/0278305 A1     Sep. 1, 2022

(30) Foreign Application Priority Data
Mar. 1, 2021 (JP) ................. 2021-031945

(51) Int. Cl.
| | |
|---|---|
| *H01M 4/04* | (2006.01) |
| *H01M 4/13* | (2010.01) |
| *H01M 4/36* | (2006.01) |
| *H01M 10/0525* | (2010.01) |
| *H01M 4/02* | (2006.01) |
| *H01M 4/131* | (2010.01) |
| *H01M 4/133* | (2010.01) |

(Continued)

(52) U.S. Cl.
CPC ......... *H01M 4/043* (2013.01); *H01M 4/0404* (2013.01); *H01M 4/13* (2013.01); *H01M 4/366* (2013.01); *H01M 10/0525* (2013.01); *H01M 2004/021* (2013.01); *H01M 4/0435* (2013.01); *H01M 4/131* (2013.01); *H01M 4/133* (2013.01); *H01M 4/1391* (2013.01); *H01M 4/1393* (2013.01); *Y02E 60/10* (2013.01)

(58) Field of Classification Search
CPC ....... H01M 10/0525; H01M 2004/021; H01M 4/0404; H01M 4/043; H01M 4/0435; H01M 4/13; H01M 4/131; H01M 4/133; H01M 4/1391; H01M 4/1393; H01M 4/366; Y02E 60/10
See application file for complete search history.

(56) References Cited

U.S. PATENT DOCUMENTS

| | | |
|---|---|---|
| 7,153,611 B2 | 12/2006 | Minami et al. |
| 2010/0129711 A1 | 5/2010 | Kashiwagi et al. |

(Continued)

FOREIGN PATENT DOCUMENTS

| | | |
|---|---|---|
| CN | 101485011 A | 7/2009 |
| CN | 106804115 B | 9/2020 |

(Continued)

*Primary Examiner* — Lingwen R Zeng
(74) *Attorney, Agent, or Firm* — HAUPTMAN HAM, LLP

(57) ABSTRACT

An electrode having both high energy density and ion diffusivity includes an electrode active material layer on either a positive-or negative-electrode current collector, in which the electrode active material layer has a concave/convex shape on its surface in a predetermined pattern at a constant pitch. In a cross-sectional SEM image of the electrode active material layer, linear cracks are unevenly distributed in a concave portion compared to in a convex portion.

9 Claims, 4 Drawing Sheets

(51) Int. Cl.
*H01M 4/1391* (2010.01)
*H01M 4/1393* (2010.01)

(56) References Cited

U.S. PATENT DOCUMENTS

| | | | |
|---|---|---|---|
| 2010/0151321 A1* | 6/2010 | Yamamoto | H01M 10/0427 |
| | | | 429/246 |
| 2014/0342225 A1 | 11/2014 | Isshiki et al. | |
| 2016/0118642 A1 | 4/2016 | Enokihara | |
| 2017/0157642 A1 | 6/2017 | Ozaki et al. | |
| 2017/0256781 A1 | 9/2017 | Suzuki et al. | |
| 2017/0346067 A1 | 11/2017 | Umehara et al. | |
| 2018/0241043 A1 | 8/2018 | Miyatake et al. | |

FOREIGN PATENT DOCUMENTS

| | | | |
|---|---|---|---|
| JP | 2007-157704 A | 6/2007 |
| JP | 2007-328977 A | 12/2007 |
| JP | 201065276 A | 3/2010 |
| JP | 2013-8523 A | 1/2013 |
| JP | 201377560 A | 4/2013 |
| JP | 2013229315 A | 11/2013 |
| JP | 2015138619 A | 7/2015 |
| JP | 201681871 A | 5/2016 |
| JP | 2017-100103 A | 6/2017 |
| JP | 2017-212088 A | 11/2017 |
| JP | 2018-137187 A | 8/2018 |
| JP | 2019-46765 A | 3/2019 |
| JP | 2020-61282 A | 4/2020 |
| WO | 2020/026525 A1 | 2/2020 |

\* cited by examiner

AFTER DRYING STEP

PRESSING STEP

AFTER PRESSING STEP

SECONDARY BATTERY ELECTRODE AND METHOD FOR PRODUCING THE ELECTRODE

CROSS REFERENCE TO RELATED APPLICATIONS

Priority is claimed based on Japanese Patent Application No. 2021-031945, filed on Mar. 1, 2021, the content of which is incorporated in the present specification as a whole by reference.

BACKGROUND OF THE DISCLOSURE

1. Technical Field

The present disclosure relates to a secondary battery electrode and a method for producing the electrode.

2. Description of Background

Secondary batteries such as lithium ion secondary batteries are lighter in weight and have a higher energy density than existing batteries, and are therefore preferably used as high-output power sources for mounting on vehicles or power sources for personal computers and portable terminals. Examples of typical structures of positive electrodes and negative electrodes (hereinafter, simply referred to as "electrodes" in a case where positive and negative electrodes are not particularly distinguished) in these kinds of secondary batteries include one in which an electrode active material layer having as a main component an electrode active material on a single surface or both surfaces of a foil-shaped electrode current collector is formed.

Such an electrode active material layer is formed such that a slurry (paste)-like electrode material prepared by dispersing solid contents, such as an electrode active material, a binding material (binder), and a conductive material, in a predetermined solvent is applied on the surface of a current collector to form a coating film, the coating film is dried, and then a pressing pressure is applied thereto to obtain predetermined density and thickness. Alternatively, instead of such film formation using a mixture slurry, moisture powder sheeting (MPS) has also been examined in which a film is formed using a so-called moisture powder in which granular aggregates are formed in a state where the proportion of solid contents is relatively higher than that of a mixture slurry and a solvent is held on surfaces of active material particles and surfaces of binder molecules.

Examples of such moisture powder sheeting include a method in which a moisture powder (electrode material) is supplied between a pair of rolls (a first roll and a second roll) arranged opposite to each other, the electrode material in a coating film state is attached to one roll (transfer roll) of the pair of rolls, and the attached electrode material (coating film) is transferred to either a corresponding positive- or negative-electrode current collector to form a film of an electrode mixture layer composed of the coating film. It is disclosed in Japanese Patent Application Publication No. 2013-77560 that a difference is given in rotational speed or adhesiveness to the first roll and the second roll to suitably transfer the electrode material to the second roll in such film formation method.

Japanese Patent Application Publication No. 2016-81871 discloses a method for producing an electrode having a structure in which there are few interparticle voids of an electrode active material layer on a current collector side and many interparticle voids on a surface side thereof, due to a relatively increased surface rigidity of a second roll and a relatively decreased surface rigidity of a first roll. In addition, a method for producing an electrode capable of improving ion diffusivity using the first roll of which the surface has irregularities has been disclosed.

SUMMARY

However, according to the results of extensive studies conducted by the present inventors, it has been found that, in electrodes produced through conventional methods, ion diffusivity improves due to many interparticle voids, but the energy density is insufficient. In addition, when the film formation and the formation of concavities/convexities are performed simultaneously, the surface of a coating film is subjected to concavity/convexity processing in a state where the film formation has been insufficiently performed. Therefore, optimal concavities/convexities for ion diffusivity cannot be formed. As a result, it has been found that the ion diffusivity is not sufficiently improved.

With the foregoing in view, it is a main object of the present disclosure to provide an electrode achieving both high energy density and ion diffusivity. In addition, a further object of the present disclosure is to provide a method for producing an electrode.

In order to achieve the above-described objects, a secondary battery electrode is provided. The secondary battery electrode disclosed herein which is either a positive or negative electrode of a secondary battery includes an electrode current collector and an electrode active material layer formed on the electrode current collector, and the electrode active material layer has a concave/convex shape on its surface in a predetermined pattern at a constant pitch. Here, in a cross-sectional SEM image of the electrode active material layer, linear cracks are unevenly distributed in a concave portion compared to a convex portion.

According to such a configuration, Li ions are suitably introduced into an electrode active material around the linear cracks. In addition, the convex portion near the concave portion in which linear cracks are unevenly distributed may be in a state where sufficient Li ions are supplied while high energy density is maintained. Accordingly, an electrode having both high energy density and ion diffusivity can be realized.

In one suitable aspect of the electrode disclosed herein, when the concave portion of the electrode active material layer is evenly divided into three layers of an upper layer, an intermediate layer, and a lower layer in a thickness direction from the surface of the electrode active material layer to the electrode current collector, the linear cracks are unevenly distributed in the intermediate layer and/or the lower layer of the concave portion in the cross-sectional SEM image of the electrode active material layer.

According to such a configuration, since linear cracks are unevenly distributed in the vicinity of a current collector of an electrode active material layer, Li ions are suitably introduced also into an electrode active material around the current collector. Accordingly, the entire electrode active material layer can efficiently contribute to an electrochemical reaction.

In one suitable aspect of the electrode disclosed herein, the linear cracks have a length of at least 10 μm or more and a maximum thickness of at least 1 μm or more. In addition, in another suitable aspect, an average porosity of the electrode active material layer is at least 15% or more.

According to such a configuration, an electrode more suitably having both high energy density and ion diffusivity can be realized.

In order to achieve the above-described further object, a method for producing an electrode is provided. The method for producing a secondary battery electrode disclosed herein is a method for producing an electrode including either a positive- or negative-electrode current collector and either a positive- or negative-electrode active material layer, the method including the following steps: a step in which a moisture powder formed by aggregated particles containing at least an electrode active material, a binder resin, and a solvent is prepared, here, in the moisture powder, at least 50% by number or more of the aggregated particles form a pendular state or a funicular state in a solid phase, a liquid phase, and a gas phase; a step in which a coating film composed of the moisture powder is formed using the moisture powder on the electrode current collector while leaving a gas phase of the coating film; a step in which a concave/convex shape is formed with a predetermined pattern and a constant pitch on a surface part of the coating film with the gas phase; a step in which the coating film which the concave/convex shape is dried, to form an electrode active material layer; and a step in which the electrode active material layer is pressed; in which, here, in the pressing step, pressing is performed such that the linear cracks observed in a cross-sectional SEM image of the electrode active material layer are unevenly distributed in a concave portion compared to in a convex portion.

By forming concavities/convexities on the surface of a coating film (electrode) before drying after forming a film while leaving a gas phase, a desired concave/convex shape can be formed without causing a local deviation in electrode density. The electrode density of the convex portion can be improved by pressing the electrode to which such a concave/convex shape is imparted with a predetermined pressing pressure, and the ion diffusivity can be improved by causing cracks in the concave portion. According to such a configuration, it is possible to produce a suitable electrode having the above-described characteristics.

In one suitable aspect of the method for manufacturing an electrode disclosed herein, pressing is performed such that the linear cracks having a length of at least 10 μm or more and a maximum thickness of at least 1 μm or more are unevenly distributed in the concave portion compared to in the convex portion based on measurement in the cross-sectional SEM image of the electrode active material layer. In addition, in another suitable aspect, the pressing in the pressing step is carried out by passing the electrode active material layer formed on the electrode current collector between a pair of rotating rolls.

According to such a configuration, an electrode having improved ion diffusivity can be suitably produced by forming appropriate cracks in a concave portion of an electrode active material layer.

BRIEF DESCRIPTION OF THE DRAWINGS

FIGS. 4A to 4D are explanatory views schematically showing a state where there are solid phases (solid contents such as active materials), liquid phases (solvents), and gas phases (voids) in aggregated particles constituting a moisture powder, in which FIG. 4A shows a pendular state, FIG. 4B shows a funicular state, FIG. 4C shows a capillary state, and FIG. 4D shows a slurry state;

FIGS. 5A to 5C are views schematically showing a pressing step of an electrode mixture layer according to one embodiment, in which FIG. 5A shows a state after a drying step, FIG. 5B shows a state of the pressing step, and FIG. 5C shows a state after the pressing step;

DETAILED DESCRIPTION

Hereinafter, suitable embodiments of an electrode and a method for manufacturing an electrode disclosed herein will be described by taking an electrode suitably employed for a lithium ion secondary battery which is a typical example of a secondary battery, as an example. Matters other than those specifically mentioned in the present specification and required for implementation can be understood as design matters of those skilled in the art based on the conventional art in the fields. The electrode and the method for manufacturing an electrode disclosed herein can be implemented based on the contents disclosed in the present specification and common technical knowledge in the field.

In addition, dimensional relationships (between a length, a width, a thickness, and the like) do not reflect actual dimensional relationships.

In addition, the notation of "A to B (where A and B are arbitrary values)" indicating a range in the present specification means A or more and B or less.

In the present specification, a "secondary battery" refers to a general power storage device that can be repeatedly recharged and includes electric double-layer capacitors (that is, physical batteries) in addition to so-called storage batteries (that is, chemical batteries) such as a lithium ion secondary battery, a nickel hydride battery, and a nickel-cadmium battery. In addition, a "lithium ion secondary battery" in the present specification refers to a non-aqueous electrolytic solution secondary battery in which lithium ions are used as charge carriers and charging and discharging are realized by movement of charges accompanying the lithium ions between positive and negative electrodes. In the present specification, when it is unnecessary to particularly distinguish a positive electrode from a negative electrode, these are simply referred to as electrodes.

Figure 1:
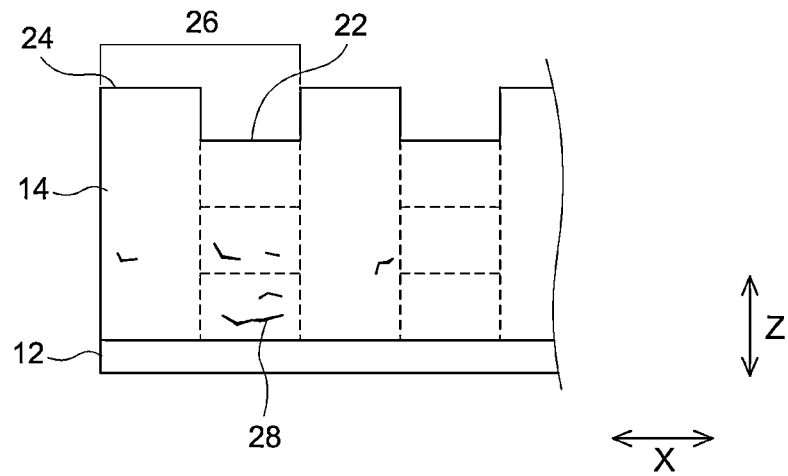
FIG. 1 is a view schematically illustrating an electrode according to one embodiment.
Figure 2:
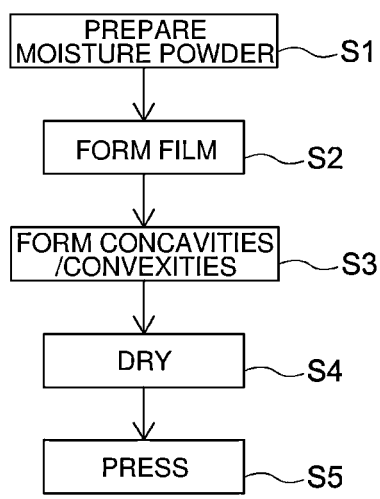
FIG. 2 is a flowchart showing a rough process of a method for producing an electrode according to one embodiment.

An electrode 10 includes, as shown in FIG. 1, an electrode current collector 12 and an electrode active material layer 14 formed on the electrode current collector 12. The electrode 10 disclosed herein has a concave/convex shape on the surface of the electrode active material layer 14 in a predetermined pattern at a constant pitch and is characterized in that linear cracks 28 are unevenly distributed in a concave portion 22 compared to in a convex portion 24 of the electrode active material layer 14. In FIG. 2, reference sign X indicates a longitudinal direction of the electrode and a reference sign Z indicates a thickness direction of the electrode.

As the electrode current collector 12, a metal electrode current collector used as an electrode current collector of this type of secondary battery can be used without particular limitation. In a case where the electrode current collector 12 is a positive electrode current collector, the electrode current collector 12 is made of, for example, a metal material, such as aluminum, nickel, titanium, or a stainless steel, having favorable conductivity. Aluminum (for example, aluminum foil) is particularly preferable. In a case where the electrode current collector 12 is a negative electrode current collector, the electrode current collector 12 is made of, for example, a metal material, such as copper, an alloy mainly composed of copper, nickel, titanium, or a stainless steel, having favorable conductivity. Copper (for example, copper foil) is particularly preferable. The thickness of the electrode current collector 12 is, for example, approximately 5 μm to 20 μm and preferably 8 μm to 15 μm.

The electrode material forming the electrode active material layer 14 contains at least a plurality of electrode active material particles, a binder resin, and a solvent.

A compound with a composition employed as a negative electrode active material or a positive electrode active material of a conventional secondary battery (here, a lithium ion secondary battery) can be used as an electrode active material which is a main component of a solid content. Examples of negative electrode active materials include carbon materials such as graphite, hard carbon, and soft carbon. In addition, examples of positive electrode active materials include lithium transition metal composite oxides such as $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$, and lithium transition metal phosphate compounds such as $LiFePO_4$. The average particle diameter of an electrode active material is not particularly limited but is suitably about 0.1 μm to 50 μm and preferably about 1 to 20 μm. In the present specification, an "average particle diameter" refers to a particle diameter (also referred to as $D_{50}$, a median diameter) corresponding to a cumulative frequency of 50 volume % from the fine particle side having a small particle diameter in a volume-based particle size distribution based on a usual laser diffraction-light scattering method.

As solvents, N-methyl-2-pyrrolidone (NMP), aqueous solvents (water or a mixed solvent mainly composed of water), or the like can be preferably used.

Examples of binder resins include polyvinylidene fluoride (PVDF), carboxymethyl cellulose (CMC), styrene butadiene rubber (SBR), and polyacrylic acid (PAA). An appropriate binder resin is employed depending on a solvent to be used.

The electrode material may contain substances other than an electrode active material and a binder resin as a solid content, for example, a conductive material, a thickener, or the like. Suitable examples of conductive materials include carbon black such as acetylene black (AB) and carbon materials such as a carbon nanotube. In addition, carboxymethyl cellulose (CMC), methyl cellulose (MC), or the like can be preferably used as a thickener, for example. The electrode material may contain materials (for example, various additives) other than those described above.

In the present specification, a "solid content" refers to a material (solid material) excluding a solvent among the above-described materials, and a "solid fraction" refers to a proportion of a solid content in an electrode material in which all materials are incorporated.

The average film thickness of the electrode active material layer 14 is not particularly limited, but may be, for example, 10 μm or more and 300 μm or less (for example, 20 μm or more and 250 μm or less).

Here, the upper layer, the intermediate layer, and the lower layer in the present specification will be described with reference to FIG. 1. The concave portion 22 of the electrode active material layer 14 is evenly divided into three layers of an upper layer, an intermediate layer, and a lower layer. The lower layer refers to a layer positioned at within approximately 33% of the thickness of the electrode active material layer 14 along the thickness direction (Z-direction) from the interface between the electrode active material layer 14 and the electrode current collector 12. Similarly, the intermediate layer refers to a layer positioned at approximately 33% to 66% of the thickness of the electrode active material layer 14 along the thickness direction (Z-direction) of the electrode active material layer 14, and the upper layer refers to a layer positioned at approximately 66% to 100% of the thickness of the electrode active material layer 14.

A concave/convex shape is formed on the surface of the electrode 10 (more specifically, the electrode active material layer 14) disclosed herein in a predetermined pattern at a constant pitch. In the present specification, a "pattern" refers to a specific shape (design). A "pitch" refers to a smallest unit in which a concave portion 22 and a convex portion 24 are repeated, and is represented by a reference numeral 26 in FIG. 1. The pitch is not particularly limited, but is, for example, preferably 250 μm or more and 5 mm or less, more preferably 750 μm or more and 4 mm or less, and still more preferably 1 mm or more and 3 mm or less. The difference in height (that is, the maximum peak height and the maximum valley depth) of the concave/convex shape is, for example, about 10 to 100 μm (for example, 20 to 80 μm).

The electrode 10 (more specifically, the electrode active material layer 14) disclosed herein is characterized in that the linear cracks 28 can be observed in a cross-sectional SEM image acquired using a scanning electron microscope (SEM). In the present specification, "linear cracks" refer to relatively large voids having a length of at least 10 μm or more and a maximum line thickness of at least 1 μm or more.

More suitably, the length of a linear crack 28 may be 10 μm or more and 100 μm or less or may be 20 μm or more and 90 μm or less. In addition, the maximum thickness may be 1 μm or more and 20 μm or less or may be 5 μm or more and 15 μm or less.

Such linear cracks 28 are unevenly distributed in the concave portion 22 compared to in the convex portion 24 of the electrode active material layer 14. That is, in the cross-sectional SEM image of the electrode active material layer 14, more linear cracks 28 can be observed in the concave portion 22 than in the convex portion 24. Accordingly, the electrode density of the concave portion 22 is relatively low, and the electrode density of the convex portion 24 is relatively high. Insertion and desorption of Li ions are promoted in such a region having a low electrode density, and a conductive path in the region having a high electrode density improves. In addition, when there are linear cracks 28, Li ions can be suitably inserted into an electrode active material around the linear cracks 28. When such a region having a relatively low electrode density and a region having a relatively high electrode density are repeated in a predetermined pattern and there are linear cracks, the entire electrode active material layer 14 can contribute to an electrochemical reaction.

The electrode 10 disclosed herein is characterized in that the above-described linear cracks 28 are unevenly distributed in the intermediate layer and/or the lower layer of the concave portion 22 in the electrode active material layer. Accordingly, the electrode densities of the intermediate layer and the lower layer of the concave portion 22 of the electrode active material layer 14 are relatively low. When the linear cracks 28 are unevenly distributed in the electrode active material layer 14 on the electrode current collector 12 side, the insertion and desorption of Li ions on the electrode current collector 12 side can be more promoted and the ion diffusivity can be further improved.

In a case where moderate linear cracks 28 are formed, the insertion and desorption of Li ions can be promoted and the ion diffusivity can be improved as described above. Considering such points, the average porosity of the electrode active material layer 14 may be at least 15% or more (for example, 20% or more). On the other hand, in a case where excessive linear cracks 28 are formed in the electrode active material layer 14 and the porosity is too high, the energy density may decrease and battery performance of a secondary battery may deteriorate. Accordingly, the average porosity of the electrode active material layer 14 may be at most 35% (for example, 30% or less).

In the present specification, an "average porosity (gas phase rate)" can be calculated through observation of a cross section of the electrode active material layer using a scanning electron microscope (SEM), for example. The cross-sectional image is subjected to binarization processing, in which a solid phase portion is made white and a gas phase (void) portion is made black, using open-source image analysis software "ImageJ" known as public domain image processing software. Accordingly, "S2/(S1+S2)×100" can be calculated in which the area of portions (white portions) where there is a solid phase is defined as S1 and the area of void portions (black portions) is defined as S2. This is regarded as a porosity of an electrode active material layer. A plurality of cross-sectional SEM images are acquired (for example, 5 images or more), and an average value of such a porosity is regarded as an "average porosity (gas phase rate)" here. Concave portions (that is, macroscopic voids) formed in the process of forming concavities/convexities are not included in the "average porosity (gas phase rate)."

Method for Producing Electrode

As shown in FIG. 2, roughly speaking, the method of producing an electrode disclosed here includes the following 5 steps: (1) a step in which a moisture powder (electrode material) is prepared (S1); (2) a step in which a coating film composed of the moisture powder is formed (S2); (3) a step in which concavities/convexities are formed on the coating film (S3); (4) a step in which the coating film is dried after the formation of the concavities/convexities (S4); and (5) a step in which the coating film (electrode active material layer) is pressed after drying (S5), and is characterized in that pressing is performed so that cracks are unevenly distributed in a concave portion of the electrode active material layer in the pressing step S5. Accordingly, other steps are not particularly limited, and the same configuration as that of this kind of conventional production method may be used. Hereinafter, each of the steps will be described.

Figure 3:
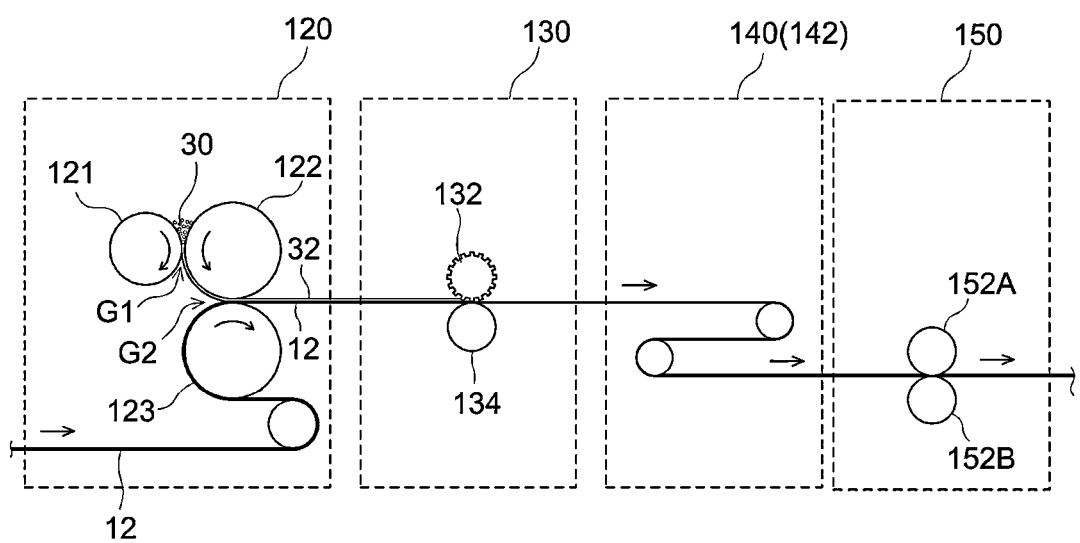
FIG. 3 is a block diagram schematically showing a configuration of an electrode production apparatus including a roll film formation unit according to one embodiment.

FIG. 3 is an explanatory view schematically showing an overview configuration of an electrode production apparatus including a roll film formation unit according to the present embodiment. An electrode production apparatus 100 shown in FIG. 3 typically includes: a film formation unit 120 which forms a coating film 32 made of an electrode material 30 on the surface of the sheet-shaped electrode current collector 12 while transporting the electrode current collector 12 which has been transported from a supply chamber not shown in the drawing along a longitudinal direction; a coating film processing unit 130 which forms a concave/convex shape on the surface of the coating film 32; a drying unit 140 which appropriately dries the coating film 32 having a concave/convex shape on its surface to form an electrode active material layer 14; and a pressing unit 150 which performs pressing so that the linear cracks 28 are unevenly distributed in the concave portion 22 of the electrode active material layer 14 after drying. These are arranged in order along a predetermined transport route.

Preparing Step

The electrode material 30 can be prepared by mixing the above-described materials such as an electrode active material, a solvent, a binder resin, and other additives with each other using a mixing device well-known in the conventional art. Examples of such mixing devices include a planetary mixer, a ball mill, a roll mill, a kneader, and a homogenizer.

The electrode material 30 may have the form of a paste, a slurry, and a granulated body. However, a granulated body, particularly a moisture granulated body (moisture powder) containing a small amount of solvent, is suitable for the purpose of forming the electrode active material layer 14 on the electrode current collector 12 in the electrode production apparatus 100 disclosed herein. Morphological classification of moisture powders in the present specification is disclosed in "Particle Size Enlargement" by Capes C. E. (published by Elsevier Scientific Publishing Company, 1980), in which four classifications currently well known are employed and the moisture powder disclosed herein is clearly defined. Specifically, the four classifications are as follows.

The existence forms (filled states) of solid contents (solid phases), solvents (liquid phases), and voids (gas phases) in the agglomerated particles constituting a moisture powder can be classified into four states: a "pendular state," a "funicular state," a "capillary state," and a "slurry state."

Figure 4A:
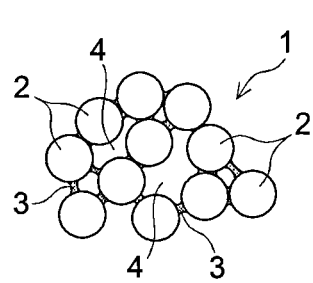

Here, as shown in FIG. 4A, "pendular state" means a state in which a solvent (liquid phase) 3 is discontinuously present so as to cross-link between active material particles (solid phases) 2 in aggregated particles 1, and the active material particles (solid phases) 2 may be present in a state where these are connected to (continuous with) each other. As shown in the drawing, the content of the solvent 3 is relatively low. As a result, most of voids (gas phases) 4 present in the aggregated particles 1 are continuously present and form communication holes that lead to the outside. In addition, one characteristic of the pendular state is that a continuous solvent layer is not observed over the entire outer surface of the agglomerated particle 1 in electron microscope observation (SEM observation). [0033]

Figure 4B:
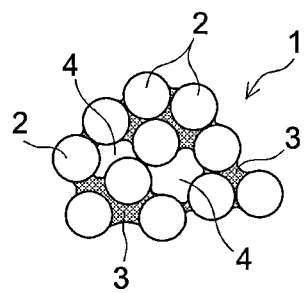

In addition, as shown in FIG. 4B, the "funicular state" means a state in which the content of a solvent in aggregated particles 1 is relatively higher than that in the pendular, and a state in which solvent (liquid phase) 3 is present continuously around active material particles (solid phases) 2 in the aggregated particles 1. However, since the amount of solvent is still small, the active material particles (solid phases) 2 are present in a state where these are connected to (continuous with) each other similarly to the pendular state. On the other hand, although the proportion of communication holes among voids (gas phases) 4 present in the aggregated particles 1 which communicate with the outside tends to decrease slightly and the proportion of discontinuous isolated voids present therein tends to increase, the presence of communication holes is recognized.

The funicular state is a state between the pendular state and the capillary state, if funicular states are classified into a funicular I state, which is closer to the pendular state (that is, a state in which the amount of solvent is relatively low), and a funicular II state, which is closer to the capillary state (that is, a state in which the amount of solvent is relatively high), a funicular I state encompasses a state in which a connected layer of solvent is not observed at the outer surface of the aggregated particle 1 in electron microscope observations (SEM observations).

Figure 4C:
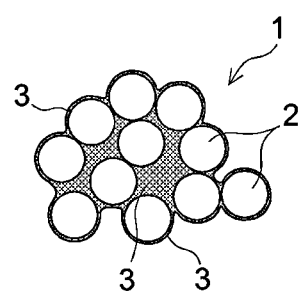

As shown in FIG. 4C, in the "capillary state," the content of a solvent in the aggregated particles 1 increases so that the amount of solvent in the aggregated particles 1 is in a nearly saturated state. As a result of a sufficient amount of solvent 3 present around the active material particles 2, the active material particles 2 are present in a discontinuous state. Regarding voids (gas phases) present in the aggregated particles 1, almost all the voids (for example, 80 vol % of the total void volume) are present as isolated voids due to the increase in the amount of solvent, and the abundance ratio of the voids in the aggregated particles also becomes small.

Figure 4D:
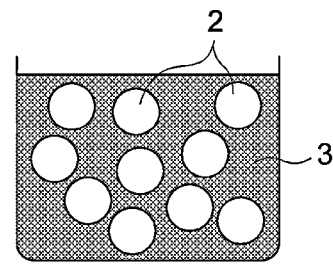

As shown in FIG. 4D, the "slurry state" is a state where the active material particles 2 are suspended in the solvent 3 and are no longer called aggregated particles. There is almost no gas phase. Moisture powder sheeting in which a film is formed with a moisture powder is known in the conventional art. However, in the moisture powder in the moisture powder sheeting in the conventional art, a liquid phase is continuously formed over the entire powder. In other words, the moisture powder is in the "capillary state" shown in FIG. 4C.

In contrast, the moisture powder disclosed herein is (1) a moisture powder in which at least 50% by number or more of the aggregated particles 1 form the above-described pendular state or funicular state (particularly the funicular I state). The moisture powder preferably has (2) one morphological characteristic that a layer of the solvent is not recognized over the entire outer surface of the aggregated particles in electron microscope observation.

Hereinafter, the moisture powder satisfying the above-described requirements (1) and (2) disclosed herein will be referred to as a "gas phase-controlled moisture powder."

It is preferable that, in the gas phase-controlled moisture powder disclosed herein, at least 50% by number or more of aggregated particles satisfy the above-described requirements (1) and (2).

The gas phase-controlled moisture powder can be produced according to a conventional process of producing a moisture powder in a capillary state. That is, by adjusting the amount of solvent and the formulation of solid contents (such as active material particles and a binder resin) so that the proportion of a gas phase is larger than before, specifically, many continuous voids (communication holes) leading to the outside are formed inside aggregated particles, a moisture powder as an electrode material (electrode mixture) included in the above-described pendular state or funicular state (particularly the funicular I state) can be produced.

In addition, in order to realize liquid cross-linking between active materials with a minimum amount of solvent, it is desirable that the surface of a powder material used and a solvent used have appropriate affinity.

It is preferable that examples of suitable gas phase-controlled moisture powders disclosed herein include a moisture powder in which states of three phases recognized through electron microscope observation are a pendular state or a funicular state (particularly a funicular I state) and in which "the ratio of the loose bulk specific gravity X and the true specific gravity Y (Y/X)" is 1.2 or more, preferably 1.4 or more (and further preferably 1.6 or more) and is 2 or less, the ratio being calculated from the loose bulk specific gravity X (g/mL), which is measured by placing an obtained moisture powder in a container having a prescribed volume (mL) and then leveling the moisture powder without applying a force, and the raw material-based true specific gravity Y (g/mL), which is the specific gravity calculated from the composition of the moisture powder on the assumption that no gas phase is present.

Regarding the above-described moisture powder, a moisture powder (that is, an aggregate of aggregated particles) can be produced by mixing materials using an agitation granulator (a mixer such as a planetary mixer). Specifically, for example, an electrode active material and various additives (such as a binder resin, a thickening material, and a conductive material) which are solid contents are placed in a mixing vessel of an agitation granulator, and a mixing blade is rotated, for example, at a rotational speed of 2000 rpm to 5000 rpm for about 1 to 30 seconds by driving a motor to produce a mixture of solid matters. Then, a small amount of solvent measured so that the amount of solid contents is 55% or more and more preferably 60% or more (for example, 65% to 90%) is added to the mixing vessel, and the mixing blade is further rotated, for example, at a rotational speed of 100 rpm to 1000 rpm for about 1 to 30 seconds. Accordingly, a moisture granulated body (moisture powder) can be produced by mixing the materials with the solvent in the mixing vessel. Furthermore, it is possible to prevent aggregation of the moisture powder by intermittently performing short stirring at a rotational speed of about 1000 rpm to 3000 rpm for about 1 to 5 seconds. The particle diameter of an obtained granulated body may be, for example, 50 μm or more (for example, 100 μm to 300 μm).

In addition, the above-described gas phase-controlled moisture powder has a low solvent content to the extent that a layer of a solvent is not recognized on the outer surface of aggregated particles (for example, a solvent fraction may be about 2% to 15% or 3% to 8%) and conversely has a relatively large gas phase part. Such a gas phase-controlled moisture powder can be produced according to the process of producing the above-described moisture powder. That is, by adjusting the amount of solvent and the formulation of solid contents (such as active material particles and a binder resin) so that the proportion of a gas phase is larger than that in the above-described moisture powder, specifically, many continuous voids (communication holes) leading to the outside are formed inside aggregated particles, a moisture powder as an electrode material included in the above-described pendular state or funicular state (particularly the funicular I state) can be produced. In addition, in order to realize liquid cross-linking between active materials with a minimum amount of solvent, it is desirable that the surface of a powder material used and a solvent used have appropriate affinity.

Film Forming Step

In the production method disclosed herein, the coating film 32 is formed while leaving a gas phase (void) of the electrode material 30. The coating film 32 made of the electrode material 30 can be formed in the film formation unit 120 as schematically shown in FIG. 3, for example. The film formation unit 120 includes a pair of rotary rolls 121 and 122 including a first rotary roll 121 (hereinafter, referred to as a "supply roll 121") and a second rotary roll 122 (hereinafter, referred to as a "transfer roll 122"). The outer circumferential surface of the supply roll 121 and the outer circumferential surface of the transfer roll 122 face each other, and the pair of rotary rolls 121 and 122 can rotate in opposite directions as shown by arrows in FIG. 3. In addition, the supply roll 121 and the transfer roll 122 are separated by a distance corresponding to a desired thickness of the coating film 32 formed on the electrode current collector 12. That is, there is a gap G1 having a predetermined width (thickness) between the supply roll 121 and the transfer roll 122, and the thickness of the coating film 32 made of the electrode material 30 attached to the surface of the transfer roll 122 can be controlled by the size of such a gap G1. In addition, by adjusting the size of such a gap G1, a force for compressing the electrode material 30 passing between the supply roll 121 and the transfer roll 122 can also be adjusted. For this reason, by making the size of the gap relatively large, the film formation can be performed in a state where gas phases of the electrode material 30 (specifically, each of the aggregated particles) are maintained.

In addition, in a case where the electrode material 30 is composed of a gas phase-controlled moisture powder, a suitable coating film can be formed while maintaining communication holes of the gas phase-controlled moisture powder by performing such a film formation step S2. That is, excessive crushing of aggregated particles constituting the gas phase-controlled moisture powder can be prevented, communication holes can be maintained, and generation of isolated voids in the aggregated particles can be prevented.

Partition walls not shown in the drawing may be provided at both end portions of the supply roll 121 and the transfer roll 122 in the width direction. Partition walls can hold the electrode material 30 on the supply roll 121 and the transfer roll 122 and define the width of the coating film 32 formed on the electrode current collector 12 depending on the distance between two partition walls. The electrode material 30 is supplied between these two partition walls using a feeder (not shown in the drawing) or the like.

In the film formation device according to the present embodiment, a backup roll 123 is disposed at a position facing the transfer roll 122 as a third rotary roll. The backup roll 123 plays a role of transporting the electrode current collector 12 to the transfer roll 122. The transfer roll 122 and the backup roll 123 rotate in opposite directions as shown by arrows in FIG. 3. That is, there is a gap G2 having a predetermined width (thickness) between the transfer roll 122 and the backup roll 123, and the thickness of the coating film 32 formed on the electrode current collector 12 can be controlled by the size of such a gap G2.

The supply roll 121, the transfer roll 122, and the backup roll 123 are respectively connected to mutually independent drive units (motors) not shown in the drawing. By gradually increasing the rotational speeds of the supply roll 121, the transfer roll 122, and the backup roll 123 in this order, the electrode material 30 can be transported along the transfer roll 122 and can be transferred as the coating film 32 on the surface of the electrode current collector 12 which has been transported from the outer circumferential surface of the transfer roll 122 using the backup roll 123.

As an example, FIG. 3 shows the arrangement of the supply roll 121, the transfer roll 122, and the backup roll 123, but the arrangement thereof is not limited thereto.

The sizes of the supply roll 121, the transfer roll 122, and the backup roll 123 are not particularly limited, but may be the same as those of the conventional film formation device. For example, the diameters may be 50 mm to 500 mm, respectively. The diameters of these three kinds of rolls 121, 122, and 123 may be the same as or different from each other. In addition, the width for forming the coating film 32 may also be the same as that of the conventional film formation device and can be appropriately determined depending on the width of the electrode current collector 12 on which the coating film 32 is formed.

The materials of the outer circumferential surfaces of the supply roll 121, the transfer roll 122, and the backup roll 123 may be the same as those of the rotary rolls in the conventionally well-known film formation device, and examples thereof include SUS steel and SUJ steel. In order to prevent generation of metal foreign substances, the materials of the outer circumferential surfaces of the supply roll 121 and the transfer roll 122 that are directly brought into contact with the electrode material 30 are more preferably ceramics such as zirconia, alumina, chromium nitride, aluminum nitride, titania, and chromium oxide.

In the example shown in FIG. 3, there is only one transfer roll in the film formation unit 120, but the form of the film formation unit 120 is not limited thereto. For example, a plurality of transfer rolls may be provided continuously so that different pressing pressures and gaps are provided.

Concave/convex Forming Step

Formation of concavities/convexities on the coating film 32 can be performed, for example, using a concavity/convexity transfer roller 132 and a backup roller 134 as shown in FIG. 3. In the method for producing an electrode disclosed herein, a concave/convex forming step S3 is carried out on the coating film 32 formed while leaving voids (gas phases). The average porosity (gas phase rate) of such a coating film 32 is preferably at least 1% or more, and may be, for example, 1% or more and 55% or less, and typically 5% or more and 55% or less. Since spreadability is improved by forming concavities/convexities while leaving gas phases, desired concave/convex shapes can be imparted to the coating film 32 with a load smaller than before. In addition, concave/convex shapes can be formed on the surface portion of the coating film 32 without locally increasing the density (densification) even if a load is applied thereto to form concavities/convexities.

The average porosity of a coating film before drying can be obtained in the same manner as in the above-described procedure.

The concavity/convexity transfer roll 132 has concave portions and convex portions for forming a predetermined pattern on the surface of the coating film 32 at a constant pitch. The backup roll 134 is a roll for sending the electrode current collector 12 which has been transported in the transport direction while supporting the electrode current collector. The concavity/convexity transfer roll 132 and the backup roll 134 are arranged at positions facing each other. By passing the coating film 32 on the electrode current collector 12 through the gap between the concavity/convexity transfer roll 132 and the backup roll 134, the concave/convex portion of the concavity/convexity transfer roll 132 can be transferred to the surface of the coating film 32 to form a desired shape on the surface of the coating film 32. The pitch between a concave portion and a convex portion of the concavity/convexity transfer roll 132 can be set to 250 μm or more and 5 mm or less (for example, 1 mm or more and 3 mm or less). The difference in height of the concave/convex pattern of the concavity/convexity transfer roll 132 is not particularly limited, but is about 10 μm to 100 μm (for example, 20 μm to 80 μm). In addition, it is preferable to use an concavity/convexity transfer roll 132 in which the width of the concave portion 22 is 50 μm or more.

The linear pressure of the concavity/convexity transfer roll 132 is not particularly limited because it varies depending on the depth of a concave portion with a desired shape, but can be set to approximately 15 N/cm to 75 N/cm, for example, about 25 N/cm to 65 N/cm. The method for processing concavities/convexities on the coating film 32 can also be performed through a technique other than concavity/convexity transfer using a concavity/convexity transfer roll. For example, a concave/convex shape may be formed on the surface portion of the coating film 32 through pressing using a flat plate rolling mill having a desired concave/convex shape. The pressing pressure in this case can be set to, for example, about 1 MPa to 100 MPa and 5 MPa to 80 MPa.

Since gas phases are left in the coating film 32, even if a concave/convex shape is formed before a drying step S4, a desired pattern can be formed and maintained. In addition, more suitably, the coating film 32 is composed of a gas phase-controlled moisture powder. Since the gas phase-controlled moisture powder is formed in a state where communication holes are maintained as described above, formation and maintenance of a desired pattern can be more suitably performed.

Although only a pair of the concavity/convexity transfer roll 132 and the backup roll 134 are provided in the example shown in FIG. 3, the present disclosure is not limited thereto, and a plurality of concavity/convexity transfer rolls having different pressing pressures may be arranged along the transport direction. In addition, in order to adjust the state of a gas phase (void) of the coating film 32, a press roll that presses and compresses the coating film 32 in the film thickness direction may be provided on an upstream side of the concavity/convexity transfer roll 132 in the transport direction.

Drying Step

As shown in FIG. 3, a drying chamber 142 including a heater not shown in the drawing is disposed as the drying unit 140 on the downstream side of the coating film processing unit 130 of the electrode production apparatus 100 according to the present embodiment in the transport direction, and the coating film 32 transported from the coating film processing unit 130 is dried to form the electrode active material layer 14 on the surface of the electrode current collector 12. The drying method is not particularly limited, but examples thereof include techniques such as hot air drying or infrared drying. The drying step S4 may be the same as the drying step in this type of the conventional electrode production apparatus and does not particularly characterize the present teaching. Therefore, the detailed description thereof will be omitted.

Pressing Step

After the drying step S4, a pressing step S5 is carried out for the purpose of adjusting the electrode density or the weight of the electrode active material layer 14 in the pressing unit 150. Such a pressing step S5 can be performed according to a well-known conventional method using a roll rolling mill or a flat plate rolling mill. Since it is possible to suitably cause desired linear cracks 28, roll pressing using a roll rolling mill is preferably performed in the method for manufacturing an electrode disclosed herein.

Figure 5A:
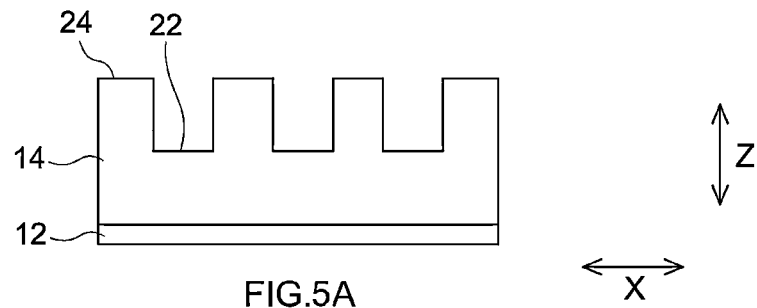
Figure 5B:
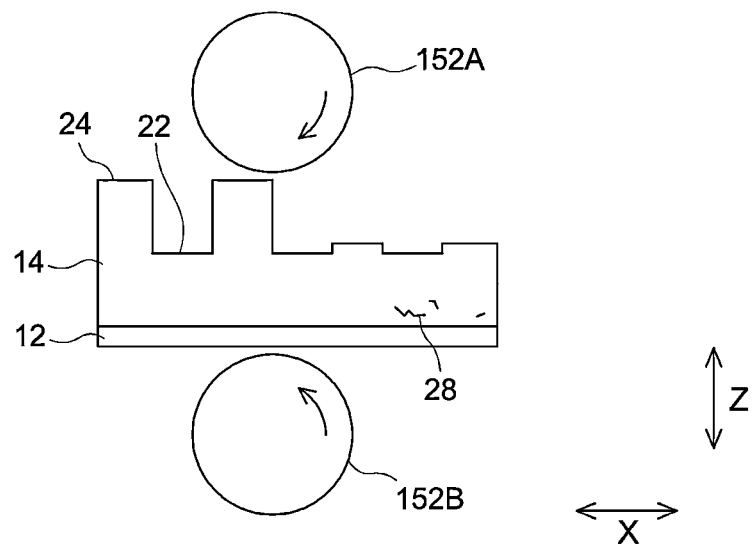
Figure 5C:
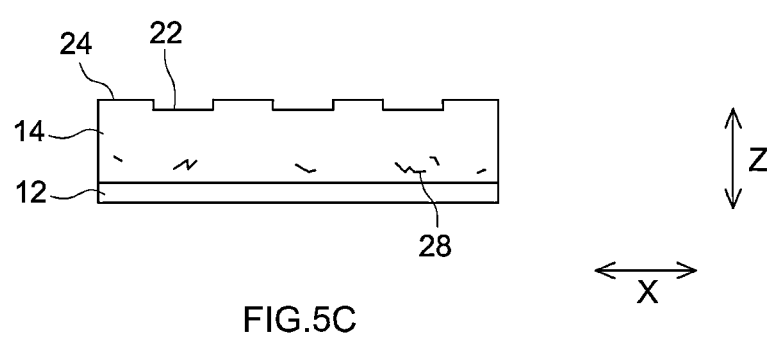

FIGS. 5A to 5C are views schematically showing a process of a pressing step S5 carried out after the drying step S4. In FIGS. 5A to 5C, FIG. 5A shows a state after the drying step, FIG. 5B shows a state of the pressing step, and FIG. 5C shows a state after the pressing step. Hereinafter, the pressing step S5 according to the present embodiment will be described with reference to FIGS. 5A to 5C. In FIGS. 5A to 5c, reference sign X indicates a longitudinal direction of the electrode and a reference sign Z indicates a thickness direction of the electrode.

The pressing carried out here is carried out so that predetermined linear cracks 28 are unevenly distributed in the concave portion 22 compared to in the convex portion 24 of the electrode 10. In general, the electrode active material layer 14 in which a solvent (liquid phase) is evaporated (volatilized) from the coating film 32 through the drying step S4 tends to have a high hardness and low spreadability compared to those of the coating film 32 before the drying step S4. Accordingly, the linear cracks 28 can be appropriately generated by applying a predetermined pressing pressure using press devices 152A and 152B as shown in FIGS. 5A to 5C.

As shown in FIG. 5A, a concave/convex shape is given to the coating film 32 (electrode active material layer 14) after the drying step S4. In the pressing step S5, pressing is performed on the electrode active material layer 14 having such a concave/convex shape using the press devices 152A and 152B. At this time, when the convex portion 24 and the concave portion 22 of the electrode active material layer 14 are compared with each other, the convex portion 24 having a large amount of the electrode material 30 inevitably has a higher electrode density. That is, by forming a concave/convex shape, the electrode density of the electrode active material layer 14 can be controlled in a predetermined pattern.

Here, as shown in FIGS. 5B and 5C, the electrode active material layer 14 is compressed in the thickness direction (Z-direction) due to pressing, and at the same time, also extends in the longitudinal direction (X-direction) of the electrode current collector 12. In particular, in a case where roll rolling mills are used as the press devices 152A and 152B, the force extending in the longitudinal direction (X-direction) more strongly works. At this time, in the concave portion 22 which is relatively thinner than the convex portion 24, a granulated body may be broken by the force extending in the longitudinal direction (X-direction) and the linear cracks 28 may be easily caused. In particular, in the vicinity of the interface with the electrode current collector 12, the linear cracks 28 are easily caused due to the difference in spreadability between the electrode current collector 12 and the electrode active material layer 14. That is, by carrying out the pressing step S5 in a state where a predetermined concave/convex shape is provided on the surface of the coating film 32, the linear cracks 28 can be unevenly distributed in the intermediate layer and/or the lower layer of the concave portion 22.

The length or the maximum line thickness of such a linear crack 28 can be adjusted by appropriately changing the pressing pressure or the like of the press devices 152A and 152B. Although the pressing pressure is not particularly limited, the linear pressure is preferably set to, for example, 1 ton/cm or more (for example, 1 ton/cm to 5 ton/cm). By performing the pressing at such a pressing pressure, suitable linear cracks 28 can be unevenly distributed in the concave portion 22 and the electrode 10 having improved ion diffusivity can be produced.

Sheet-shaped electrodes produced in this manner are used as these types of usual sheet-shaped positive or negative electrodes for constructing lithium ion secondary batteries.

Figure 6:
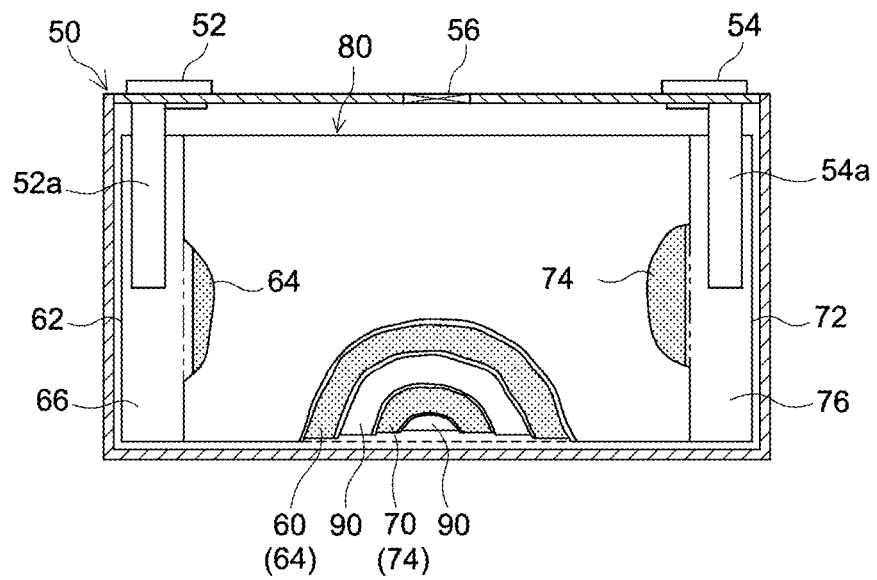
FIG. 6 is an explanatory view schematically showing a lithium ion secondary battery according to one embodiment.

For example, one example of a lithium ion secondary battery 200 that can be constructed using sheet-shaped electrodes according to the present embodiment is shown in FIG. 6.

The lithium ion secondary battery 200 shown in FIG. 6 is constructed such that a flat wound electrode body 80 and non-aqueous electrolyte (not shown in the drawing) are accommodated in a sealable box-shaped battery case 50. The battery case 50 is provided with a positive electrode terminal 52 and a negative electrode terminal 54 for external connection, and a thin safety valve 56 which is set to release the internal pressure of the battery case 50 in a case where the internal pressure rises above a predetermined level. In addition, the battery case 50 is provided with an injection port (not shown in the drawing) for injecting a non-aqueous electrolyte. The positive electrode terminal 52 and the positive electrode current collector plate 52a are electrically connected to each other. The negative electrode terminal 54 and the negative electrode current collector plate 54a are electrically connected to each other. Regarding the material of the battery case 50, a light metallic material having a high strength and good thermal conductivity is preferable, and examples of such metallic materials include aluminum or steel.

The wound electrode body 80 typically has a form in which a long sheet-shaped positive electrode (hereinafter, referred to as a positive electrode sheet 60) and a long sheet-shaped negative electrode (hereinafter, referred to as a negative electrode sheet 70) are superposed via a long sheet-shaped separator 90 and wound in the longitudinal direction. The positive electrode sheet 60 has a configuration in which a positive electrode active material layer 64 is formed on a single surface or both surfaces of a positive electrode current collector 62 along the longitudinal direction. The negative electrode sheet 70 has a configuration in which a negative electrode active material layer 74 is formed on a single surface or both surfaces of a negative electrode current collector 72 along the longitudinal direction. A portion in which the positive electrode current collector 62 is exposed (that is, a positive electrode current collector-exposed portion 66) without the positive electrode active material layer 64 formed along the edge is provided on one edge of the positive electrode current collector 62 in the width direction. A portion in which the negative electrode current collector 72 is exposed (that is, a negative electrode current collector-exposed portion 76) without the negative electrode active material layer 74 formed along the edge is provided on another edge of the negative electrode current collector 72 in the width direction. The positive electrode current collector plate 52a and the negative electrode current collector plate 54a are respectively joined to the positive electrode current collector-exposed portion 66 and the negative electrode current collector-exposed portion 76.

A positive electrode and a negative electrode obtained through the above-described production method are used as the positive electrode (positive electrode sheet 60) and the negative electrode (negative electrode sheet 70). In the present configuration example, the electrode active material layer 14 (the positive electrode active material layer 64 and the negative electrode active material layer 74) are formed as a positive electrode and a negative electrode on both surfaces of the electrode current collector 12 (the positive electrode current collector 62 and the negative electrode current collector 72).

Examples of the separator 90 include porous sheets (films) made of resins such as polyethylene (PE), polypropylene (PP), polyester, cellulose, and polyamide. Such porous sheets may have a single-layer structure or a structure in which two or more layers are stacked (for example, three-layer structure in which PP layers are stacked on both surfaces of a PE layer). The separator 90 may be provided with a heat resistant layer (HRL).

Non-aqueous electrolytes which are the same as those of conventional lithium ion secondary batteries can be used, and typically, organic solvents (non-aqueous solvents) containing supporting salts can be used. Organic solvents such as carbonates, esters, ethers, nitriles, sulfones, and lactones can be used as non-aqueous solvents without particular limitation. Specifically, for example, non-aqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC) can be preferably used. Such non-aqueous solvents can be used alone or in combination of two or more thereof. As supporting salts, lithium salts such as $LiPF_6$, $LiBF_4$, and $LiClO_4$ can be suitably used, for example. The concentration of supporting salts is not particularly limited, but is preferably about 0.7 mol/L or more and 1.3 mol/L or less.

The above-described non-aqueous electrolytic solution may contain components in addition to the above-described non-aqueous solvents and supporting salts, for example, various additives such as a gas generator, a film forming agent, a dispersant, and a thickener as long as the effect of the present disclosure is not significantly impaired.

The lithium ion secondary battery 200 configured as described above can be used for various applications. Examples of suitable applications include drive power sources mounted in vehicles such as battery electric vehicles (BEV), hybrid electric vehicles (HEV), and plug-in hybrid electric vehicles (PHEV). The lithium ion secondary battery 200 can also be used in the form of an assembled battery in which a plurality of lithium ion secondary batteries are connected in series and/or in parallel.

Hereinafter, an example in a case where the gas phase-controlled moisture powder in a pendular state or a funicular state disclosed herein is used as an electrode mixture will be described. However, the technology disclosed herein is not intended to be limited to that shown in such example.

EXAMPLE 1

A gas phase-controlled moisture powder that can be suitably used as a positive electrode material was produced, and then, a positive electrode active material layer was formed on aluminum foil using the produced moisture powder (positive electrode material).

In this test example, lithium transition metal oxide ($LiNi_{1/3}Co_{1/3}Mn_{1/3}O_2$) having an average particle diameter ($D_{50}$) of 20 μm based on a laser diffraction scattering method was used as a positive electrode active material, polyvinylidene fluoride (PVDF) was used as a binder resin, acetylene black was used as a conductive material, and NMP was used as a non-aqueous solvent.

First, a solid content consisting of 90 parts by mass of the above-described positive electrode active material, 2 parts by mass of PVDF, and 8 parts by mass of acetylene black was placed in an agitation granulator (a planetary mixer or a high speed mixer) having a mixing blade to perform a mixing and stirring treatment.

Specifically, the rotational speed of the mixing blade in the agitation granulator having the mixing blade was set to 4500 rpm, and a stirring and dispersing treatment was performed for 15 seconds to obtain a mixture of the powder material composed of the above-described solid content. NMP, which is a solvent, was added to the obtained mixture so that the solid fraction was 90 weight %, stirring, granulating, and compounding were performed at a rotational speed of 300 rpm for 30 seconds, and then, stirring was performed at a rotational speed of 4500 rpm for 2 seconds to perform micronization. Accordingly, a moisture powder (positive electrode material) according to the present example was produced.

Next, the above-described gas phase-controlled moisture powder (positive electrode material) was supplied to a film formation unit of the electrode production apparatus, and a coating film was transferred to the surface of a positive electrode current collector made of aluminum foil which was prepared separately.

Such a coating film was transported to a coating film processing unit, and a concave/convex shape was imparted using a concavity/convexity transfer roll (at a linear pressure of about 40 N/cm). The coating film having such a concave/convex shape was heat-dried in a drying unit and then pressed while setting the linear pressure of a roll rolling mill to about 1 ton/cm. Accordingly, an electrode in which linear cracks were unevenly distributed in an intermediate layer and a lower layer of a concave portion of an electrode active material layer was obtained.

Figure 7:
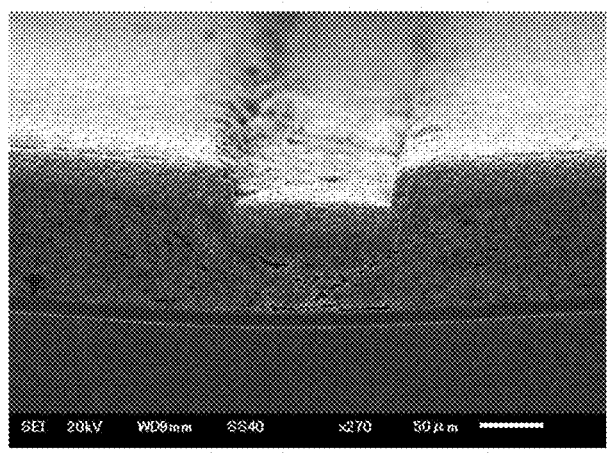
FIG. 7 is a cross-sectional SEM image showing a positive electrode active material layer (after pressing) according to one embodiment.

The state of the obtained electrode active material layer (that is, the coating film after drying) of Example 1 described above was observed with SEM. The results are shown in FIG. 7.

COMPARATIVE EXAMPLE 1

Electrode materials were mixed with each other in the same manner as in Example 1, and a coating film was transferred to the surface of a positive electrode current collector made of aluminum foil which was prepared separately. Such a coating film was transported to a coating film processing unit, and a concave/convex shape was imparted using a concavity/convexity transfer roll (at a linear pressure of about 40 N/cm). The coating film having such a concave/convex shape was heat-dried in a drying unit and then pressed while setting the linear pressure of a roll rolling mill to about 0.8 ton/cm. Accordingly, an electrode (positive electrode) in which an electrode active material layer made of a gas phase-controlled moisture powder was formed on an electrode current collector was obtained. The electrode of Comparative Example 1 is an electrode in which linear cracks are not unevenly distributed in a concave portion.

The average porosity of Example 1 and Comparative Example 1 obtained above was calculated. The average porosity was calculated by observing a cross-sectional image using a scanning electron microscope (SEM). The cross-sectional image was acquired and subjected to binarization processing, in which a solid phase portion is made white and a gas phase (void) portion is made black, using open-source image analysis software "Image)". Accordingly, "S2/(S1+S2)×100" was calculated by defining the area of portions (white portions) where there is a solid phase as S1 and the area of void portions (black portions) as S2. This is regarded as a porosity of a coating film (electrode active material layer) after drying. Five cross-sectional SEM images were acquired, and an average value of such a porosity was regarded as the "average porosity (gas phase rate)" here.

Production of Lithium Ion Secondary Batteries for Evaluation

Lithium ion secondary batteries for evaluation were produced using each of the above produced electrodes of Example 1 and Comparative Example 1.

Negative electrodes made of an electrode material in a slurry state were prepared as negative electrodes of Example 1 and Comparative Example 1.

In addition, two porous polyolefin sheets having a three-layer structure of PP/PE/PP were prepared as separator sheets.

The produced positive electrodes of Example 1 and Comparative Example 1, negative electrodes, and the prepared two separator sheets were superposed and wound to produce wound electrode bodies. An electrode terminal was attached to each of the positive electrode sheets and the negative electrode sheets of the produced wound electrode bodies through welding and accommodated in a battery case having an injection port.

A non-aqueous electrolytic solution was injected from such an injection port, and the injection port was airtightly sealed with a sealing lid. As the non-aqueous electrolytic solution, one obtained by dissolving $LiPF_6$ as a supporting salt in a mixed solvent containing ethylene carbonate (EC), dimethyl carbonate (DMC), and ethyl methyl carbonate (EMC) at a volume ratio of 1:1:1 at a concentration of 1.0 mol/L was used. Lithium ion secondary batteries for evaluation were obtained as described above.

Activation Treatment

Each lithium ion secondary battery for evaluation was activated (initially charged) in an environment of 25° C. The activation treatment was a constant current-constant voltage system in which constant current charge was performed up to 4.2 V at a current value of ⅓ C, and then constant voltage charge was performed until the current value reaches 1/50 C to enter a fully charging state. Thereafter, constant current discharge was performed until the voltage became 3.0 V at a current value of ⅓ C.

Initial Resistance Measurement

After the state of charge (SOC) of each activated lithium ion secondary battery for evaluation was adjusted to 60%, the battery was placed in a temperature environment of 25° C. The battery was discharged at a current value of 1 C for 10 seconds to obtain a voltage drop amount (ΔV). The battery resistance was calculated by dividing such a voltage drop amount ΔV by the discharge current value (1 C) and used as initial resistance. It is possible to evaluate that the output characteristics become better as such initial resistance becomes smaller.

As shown in FIG. 7, in the electrode of Example 1, it was confirmed that cracks were unevenly distributed in an intermediate layer and a lower layer of a concave portion compared to in a convex portion of an electrode active material layer. In addition, it was confirmed that the average porosity of Example 1 was 28%, the average porosity of Comparative Example 1 was 25%, and the overall average porosity was higher in Example 1. Regarding the initial resistance, when the initial resistance of Comparative Example 1 was set to 1, the initial resistance of Example 1 was 0.95.

That is, in the electrode which has a concave/convex shape on the surface of an electrode active material layer in a predetermined pattern at a constant pitch and in which linear cracks are unevenly distributed in a concave portion compared to in a convex portion in a cross-sectional SEM image of the electrode active material layer, even though the average porosity of the entire electrode is high, the convex portion has high energy density, and the ion diffusivity is improved due to linear cracks unevenly distributed in the concave portion. Therefore, the initial resistance can be reduced. Accordingly, it is possible to improve the output characteristics of a secondary battery in which such an electrode is used.

Specific examples of the present disclosure are described in detail in the preceding, but these are nothing more than examples and do not limit the scope of the claims.

Various and diverse modifications and alterations to the specific examples provided above as examples are included in the art described in the claims.

What is claimed is:

1. A secondary battery electrode that is either a positive or negative electrode of a secondary battery, the secondary battery electrode comprising:
   a long sheet-shaped electrode current collector; and
   an electrode active material layer formed on the long sheet-shaped electrode current collector, wherein
   the electrode active material layer has a concave/convex shape on its surface in a predetermined pattern at a constant pitch along a longitudinal direction of the long sheet-shaped electrode current collector, and
   in a cross-sectional SEM image of the electrode active material layer, linear cracks are unevenly distributed in a concave portion compared to in a convex portion.

2. The secondary battery electrode according to claim 1, wherein
   the concave portion of the electrode active material layer is evenly divided into three layers of an upper layer, an intermediate layer, and a lower layer in a thickness direction from the surface of the electrode active material layer to the long sheet-shaped electrode current collector, and
   the linear cracks are unevenly distributed in the intermediate layer or the lower layer of the concave portion in the cross-sectional SEM image of the electrode active material layer.

3. The secondary battery electrode according to claim 1, wherein
   the linear cracks have a length of at least 10 μm or more and a maximum thickness of at least 1 μm or more.

4. The secondary battery electrode according to claim 1, wherein
   the electrode active material layer has an average porosity of at least 15% or more.

5. A method for producing an electrode including either a positive-or negative-electrode current collector and either a positive-or negative-electrode active material layer, the method including the following steps:
   a step in which a moisture powder formed by aggregated particles containing at least an electrode active material, a binder resin, and a solvent is prepared,
   here, in the moisture powder, at least 50% by number or more of the aggregated particles form a pendular state or a funicular state in a solid phase, a liquid phase, and a gas phase;
   a step in which a coating film composed of the moisture powder is formed using the moisture powder on the electrode current collector while leaving a gas phase of the coating film;
   a step in which a concave/convex shape is formed with a predetermined pattern and a constant pitch on a surface part of the coating film with the gas phase;
   a step in which the coating film which the concave/convex shape is dried, to form an electrode active material layer; and
   a step in which the electrode active material layer is pressed; wherein
   here, in the pressing step, pressing is performed such that the linear cracks observed in a cross-sectional SEM image of the electrode active material layer are unevenly distributed in a concave portion compared to in a convex portion.

6. The method for producing an electrode according to claim 5, wherein
   in the pressing step, pressing is performed such that the linear cracks having a length of at least 10 μm or more and a maximum thickness of at least 1 μm or more are unevenly distributed in the concave portion compared to in the convex portion based on measurement in the cross-sectional SEM image of the electrode active material layer.

7. The method for producing an electrode according to claim 5, wherein
   the pressing in the pressing step is carried out by passing the electrode active material layer formed on the electrode current collector between a pair of rotating rolls.

8. The secondary battery electrode according to claim 1, wherein
   the linear cracks extend along the longitudinal direction of the long sheet-shaped electrode current collector.

9. The secondary battery electrode according to claim 8, wherein
   the concave portion of the electrode active material layer is evenly divided into three layers of an upper layer, an intermediate layer, and a lower layer in a thickness direction from the surface of the electrode active material layer to the long sheet-shaped electrode current collector, and
   the linear cracks are unevenly distributed in the intermediate layer or the lower layer of the concave portion in the cross-sectional SEM image of the electrode active material layer.

* * * * *